United States Patent
Okabe

(10) Patent No.: US 10,802,335 B2
(45) Date of Patent: Oct. 13, 2020

(54) LIGHT DIFFUSION PLATE AND DIRECT-LIT BACKLIGHT UNIT

(71) Applicant: KEIWA INC., Tokyo (JP)

(72) Inventor: Motohiko Okabe, Tokyo (JP)

(73) Assignee: Keiwa Inc., Tokyo (JP)

( * ) Notice: Subject to any disclaimer, the term of this patent is extended or adjusted under 35 U.S.C. 154(b) by 0 days.

(21) Appl. No.: 16/219,558

(22) Filed: Dec. 13, 2018

(65) Prior Publication Data

US 2019/0196269 A1    Jun. 27, 2019

(30) Foreign Application Priority Data

Dec. 26, 2017  (JP) ................................. 2017-249155

(51) Int. Cl.
| | |
|---|---|
| *G02B 5/02* | (2006.01) |
| *G02B 6/00* | (2006.01) |
| *G02F 1/13357* | (2006.01) |
| *G02F 1/1335* | (2006.01) |

(52) U.S. Cl.
CPC ..... *G02F 1/133603* (2013.01); *G02B 5/0205* (2013.01); *G02B 5/0242* (2013.01); *G02B 6/00* (2013.01); *G02F 1/133504* (2013.01)

(58) Field of Classification Search
CPC ....... G02B 5/0205; G02B 5/02; G02B 6/0051
USPC .................................................. 362/600–634
See application file for complete search history.

(56) References Cited

U.S. PATENT DOCUMENTS

| | | | |
|---|---|---|---|
| 9,821,523 B2 | 11/2017 | van Heerbeek et al. | |
| 2008/0094845 A1* | 4/2008 | Kusano ..................... | F21V 5/02 362/339 |
| 2009/0162628 A1* | 6/2009 | Kurokawa .......... | C08K 5/0016 428/220 |
| 2009/0190329 A1* | 7/2009 | Tsukada ............... | G02B 5/0215 362/97.2 |
| 2009/0207496 A1* | 8/2009 | Sasaki ........................ | C08J 5/18 359/599 |
| 2014/0293190 A1* | 10/2014 | Nakashima .......... | G02B 6/0035 362/624 |

FOREIGN PATENT DOCUMENTS

| | | |
|---|---|---|
| JP | 2007-179018 A | 7/2007 |
| JP | 101316895 A | 12/2008 |

(Continued)

*Primary Examiner* — William J Carter

(74) *Attorney, Agent, or Firm* — Norris McLaughlin, P.A.

(57) ABSTRACT

A light diffusion plate for a direct-lit backlight unit is provided which is capable of inhibiting generation of defects in production, and which is superior in mechanical strength even if being formed to be thin. The light diffusion plate for a direct-lit backlight unit includes a resin matrix, and a diffusion agent dispersed in the resin matrix, in which a principal component of the resin matrix is a polycarbonate resin, a ratio Mw/Mn of a polystyrene equivalent weight average molecular weight Mw to a number average molecular weight Mn of the polycarbonate resin, as determined by gel permeation chromatography is no less than 1.8 and no greater than 3.2, and the weight average molecular weight Mw of the polycarbonate resin is no less than $3.0 \times 10^4$ and no greater than $6.5 \times 10^4$. The light diffusion plate has an average thickness of preferably no less than 0.1 mm and no greater than 1.0 mm.

4 Claims, 1 Drawing Sheet

(56) References Cited

FOREIGN PATENT DOCUMENTS

| KR | 10-2014-0106434 A | 9/2014 |
|---|---|---|
| KR | 10-2015-0079783 A | 7/2015 |
| TW | 201433841 A | 9/2014 |

\* cited by examiner

LIGHT DIFFUSION PLATE AND DIRECT-LIT BACKLIGHT UNIT

BACKGROUND OF THE INVENTION

Field of Invention

The present invention relates to a light diffusion plate and a direct-lit backlight unit.

Description of the Related Art

LED has been employed as a backlight for liquid crystal display devices. There are two known types of backlight systems in which LED is adopted, i.e., an edge-lit type and a direct-lit type. In the edge-lit backlight, LEDs are provided linearly in up-to-down or side-to-side direction of a screen, whereas in the direct-lit backlight, LEDs are provided two-dimensionally on an entire face of a back side of the screen. Since the edge-lit backlight obviates the need for providing LED on the back side of the screen, reduction in thickness of the liquid crystal display device is enabled. On the other hand, the direct-lit backlight is capable of achieving high luminance due to use of a large number of LEDs, although spaces for providing LEDs on the back side of the screen are required.

Conventionally, the direct-lit backlight has been adopted in large liquid crystal display devices; however, reduction in size of LED leads to investigation regarding use thereof in small liquid crystal display devices. The direct-lit backlight to be adopted in small and thin liquid crystal display devices needs a light diffusion plate having a reduced thickness. Furthermore, heat resistance and mechanical strength are required in addition to light diffusibility and transparency, for the light diffusion plate having a reduced thickness.

In general, polymethacrylstyrene or polystyrene is used as a material for forming a light diffusion plate. However, such a material fails to achieve sufficient heat resistance and mechanical strength when reduction in thickness of the light diffusion plate is intended. Thus, a light diffusion plate has been proposed in which polycarbonate is used as the material for forming (Patent Document 1). The light diffusion plate of Patent Document 1 is obtained by adding a diffusion agent to an aromatic polycarbonate having a viscosity average molecular weight of no less than 12,000 and less than 15,000 and having a percentage content of a component having low molecular weight being no greater than 2.5% by mass, the low molecular weight being less than 1,000. This light diffusion plate is reportedly superior in dimension accuracy, optical characteristics and mechanical strength.

The light diffusion plate in Patent Document 1 is proposed mainly for formation to have a thickness of about 2 mm. However, in a case where a thinner light diffusion plate is demanded, optimum optical characteristics and mechanical strength of the light diffusion plate must be further studied.

On the other hand, in forming a light diffusion plate, defects resulting from undissolved matter, modified matter and the like in the light diffusion plate may be generated, whereby optical characteristics of the light diffusion plate can be deteriorated when a forming temperature of the light diffusion plate is inevitably predetermined to be high for the purpose of enabling fluidity of the material for forming to be provided. Although there may be an idea of separating such defects by using a filter for removing gelatinous unwanted substances in a state of the material for forming the light diffusion plate having been dissolved, it is difficult to selectively separate only the defects since the light diffusion plate contains the diffusion agent. Therefore, it is necessary to investigate a material for forming a light diffusion plate that is less likely to be accompanied by generation of these defects.

PRIOR ART DOCUMENTS

Patent Documents

Patent Document 1: Japanese Unexamined Patent Application, Publication No. 2007-179018

SUMMARY OF THE INVENTION

Problems to be Solved by the Invention

The present invention was made in view of the foregoing circumstances, and an object of the present invention is to provide a light diffusion plate for a direct-lit backlight unit having superior mechanical strength even if being formed to be thin, with inhibited generation of defects in production.

Means for Solving the Problems

According to an aspect of the invention made for solving the aforementioned problems, a light diffusion plate for a direct-lit backlight unit includes: a resin matrix; and a diffusion agent dispersed in the resin matrix, in which: a principal component of the resin matrix is a polycarbonate resin; a ratio Mw/Mn of a polystyrene equivalent weight average molecular weight Mw to a number average molecular weight Mn of the polycarbonate resin, as determined by gel permeation chromatography is no less than 1.8 and no greater than 3.2; and the weight average molecular weight Mw of the polycarbonate resin is no less than $3.0 \times 10^4$ and no greater than $6.5 \times 10^4$.

Since the light diffusion plate contains a polycarbonate resin as a principal component of the resin matrix, and Mw of the polycarbonate resin is no less than the lower limit described above, the light diffusion plate has superior mechanical strength even if being formed to be thin. In addition, forming at a high temperature is unnecessary and a forming temperature that is less likely to result in generation of defects in the production can be selected since Mw of the polycarbonate resin is no greater than the upper limit described above, and Mw/Mn is no less than the lower limit described above in the light diffusion plate. Furthermore, a component having a low molecular weight of the polycarbonate resin is likely to decompose during the forming, whereas a component having a high molecular weight of the polycarbonate resin is likely to become an undissolved matter during the forming. Since Mw/Mn of the polycarbonate resin is no greater than the upper limit described above in the light diffusion plate, the component having a low molecular weight and the component having a high molecular weight are contained in small amounts. Therefore, inhibition of generation of defects resulting from the component having a low molecular weight and the component having a high molecular weight of the polycarbonate resin is enabled during the production of the light diffusion plate. In other words, the light diffusion plate has superior mechanical strength even if being formed to be thin, with inhibited generation of defects in production. The term "principal component" as referred to herein means a component contained in the highest proportion, and refers to a component present in a proportion of, for example, no less than 50% by mass.

The light diffusion plate has an average thickness of preferably no less than 0.1 mm and no greater than 1.0 mm. Accordingly, the light diffusion plate is formed to be thin and has superior mechanical strength.

The content of the diffusion agent with respect to 100 parts by mass of the resin matrix is preferably no less than 0.2 parts by mass and no greater than 10 parts by mass, and the average particle diameter of the diffusion agent is preferably no less than 1.0 µm and no greater than 7.0 min. Accordingly, appropriate diffusibility can be provided in the light diffusion plate.

The light diffusion plate has a yellowness index of preferably no greater than 12. Yellowness of the light diffusion plate results from deterioration of the resin during the forming. The light diffusion plate having the yellowness index of no greater than the upper limit described above is formed from a resin which has been less deteriorated. The yellowness index as referred to herein means a value determined in accordance with JIS-K7373 (2006) and is obtained by measuring tristimulus values (X, Y, Z) through using a colorimetric color-difference meter on the light diffusion plate having an average thickness of 1.0 mm.

A direct-lit backlight unit according to another aspect of the present invention made for solving the aforementioned problems has the light diffusion plate of the aforementioned aspect.

Since the direct-lit backlight unit has the light diffusion plate having superior mechanical strength even if being formed to be thin, with inhibited generation of defects in production, reduction in size is enabled.

Effects of the Invention

As explained in the foregoing, the light diffusion plate of the present invention has superior mechanical strength even if being formed to be thin, with inhibited generation of defects in production.

DESCRIPTION OF EMBODIMENTS

Figure 1:
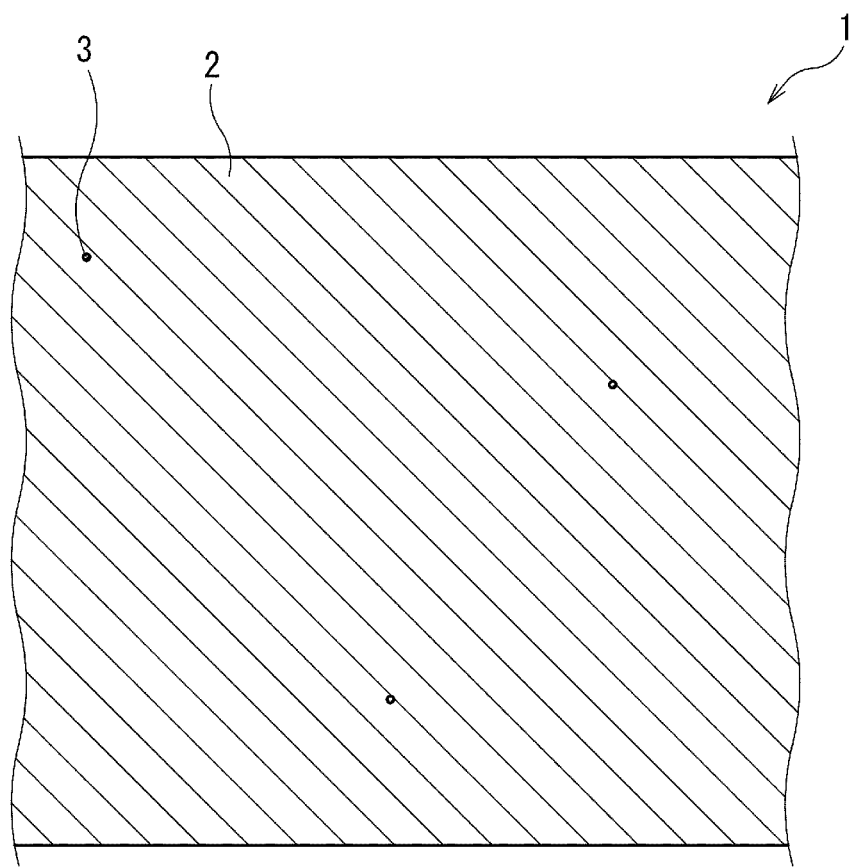
FIG. 1 is a schematic cross sectional view illustrating a light diffusion plate according to an embodiment of the present invention.

Hereinafter, embodiments of the light diffusion plate of the present invention will be described in detail.

Light Diffusion Plate

The light diffusion plate of the embodiment of the present invention is for use in a direct-lit backlight unit and is formed to have a substantially equal thickness. The light diffusion plate includes a resin matrix, and a diffusion agent dispersed in the resin matrix. According to the light diffusion plate, in transmission of incident light from one face to other face, making outgoing light even is intended through diffusion of thus transmitted light by a diffusion agent in the resin matrix. In addition, the light diffusion plate may be an extrusion-molded product, but not particularly limited thereto and may be employed, for example, as a light diffusion plate for a direct-lit backlight unit in a liquid crystal display device of about 20 inches.

The light diffusion plate is formed to be thinner than general light diffusion plates for direct-lit backlight units. The lower limit of the average thickness of the light diffusion plate is preferably 0.1 mm, more preferably 0.2 mm, and still more preferably 0.3 mm. Meanwhile, the upper limit of the average thickness of the light diffusion plate is preferably 1.0 mm, more preferably 0.9 mm, and still more preferably 0.8 mm. When the average thickness of the light diffusion plate is less than the lower limit, the mechanical strength of the light diffusion plate may be insufficient, whereby cracks may be generated during processing, reliability testing and the like. To the contrary, when the average thickness of the light diffusion plate is greater than the upper limit, the thickness of the light diffusion plate may not be sufficiently reduced.

The light diffusion plate is formed from a resin that is less likely to deteriorate. Since the light diffusion plate is preferably as transparent or as white as possible, the lower limit of yellowness index of the light diffusion plate is preferably 0. Meanwhile, the upper limit of the yellowness index of the light diffusion plate is preferably 12, more preferably 11.7, and still more preferably 11.5. When the yellowness index of the light diffusion plate is greater than the upper limit, the outgoing light from the backlight in which the light diffusion plate has been adopted may be yellow, leading to yellowish discoloration of the output image of the liquid crystal panel, whereby color reproducibility may be inferior.

Resin Matrix

A principal component of the resin matrix forming the light diffusion plate is a polycarbonate resin. As the polycarbonate resin, at least either one of a linear polycarbonate resin or a branched polycarbonate resin may be used. Of the polycarbonate resins, an aromatic polycarbonate resin is preferably used in light of transparency, impact resistance, flame retardance, dimension accuracy and the like. It is to be noted that the resin matrix is acceptable as long as it is transparent or translucent, and a resin may be included other than the polycarbonate resin that is the principal component.

The lower limit of the content of the polycarbonate resin in the resin matrix is preferably 90% by mass, more preferably 93% by mass, and still more preferably 95% by mass. Meanwhile, the upper limit of the content of the polycarbonate resin may be 100% by mass, but preferably 99% by mass, and more preferably 98% by mass. When the content is less than the lower limit, the mechanical strength of the light diffusion plate may be insufficient, whereby cracks may be generated during processing, reliability testing and the like. To the contrary, when the content is greater than the preferred upper limit, addition of other resin may be difficult, whereby a design freedom of the light diffusion plate may be impaired.

The polycarbonate resin as the principal component of the resin matrix provides superior mechanical strength and has a molecular weight enabling selection of a forming temperature that is less likely to result in generation of defects in the production. The lower limit of the polystyrene equivalent weight average molecular weight Mw of the polycarbonate resin as determined by gel permeation chromatography (GPC) may be $3.0 \times 10^4$, preferably $3.1 \times 10^4$, and more preferably $3.2 \times 10^4$. Meanwhile, the upper limit of the polystyrene equivalent weight average molecular weight Mw of the polycarbonate resin may be $6.5 \times 10^4$, more preferably $6.4 \times 10^4$, and still more preferably $6.3 \times 10^4$. When the weight average molecular weight Mw is less than the lower limit, the mechanical strength of the light diffusion plate may be insufficient, whereby cracks may be generated during processing, reliability testing and the like. To the contrary, when the weight average molecular weight Mw is greater than the upper limit, elevating the forming temperature in production of the light diffusion plate may be necessary, whereby generation of defects in the production may not be inhibited.

In addition, the polycarbonate resin has molecular weight distribution that is less likely to result in generation of defects in the production. The lower limit of a ratio Mw/Mn of a polystyrene equivalent weight average molecular weight Mw to a number average molecular weight Mn of the polycarbonate resin as determined by GPC may be 1.8, preferably 1.9, and more preferably 2.0. Meanwhile, the upper limit of the ratio Mw/Mn may be 3.2, preferably 3.1, and more preferably 3.0. When the ratio Mw/Mn is less than the lower limit, elevating the forming temperature in production of the light diffusion plate may be necessary, whereby generation of defects in the production may not be inhibited. To the contrary, when the ratio Mw/Mn is greater than the upper limit, increases in a component having a low molecular weight and a component having a high molecular weight in the polycarbonate resin may lead to failure of inhibiting generation of the defects resulting from the component having a low molecular weight and the component having a high molecular weight, in the production of the light diffusion plate.

Diffusion Agent

The diffusion agent dispersed in the resin matrix is nearly spherical particles that are transparent or translucent, and has a function of diffusing transmitted light in the resin matrix. The diffusion agent which may be employed is exemplified by organic particles such as silicone beads and acrylic beads, and inorganic particles such as silica.

The lower limit of the content of the diffusion agent with respect to 100 parts by mass of the resin matrix is preferably 0.2 parts by mass, more preferably 0.3 parts by mass, and still more preferably 0.5 parts by mass. Meanwhile, the upper limit of the content of the diffusion agent is preferably 10 parts by mass, more preferably 8 parts by mass, and still more preferably 7 parts by mass. When the content is less than the lower limit, the transmitted light in the resin matrix may not be uniformly diffused. To the contrary, when the content is greater than the upper limit, the mechanical strength of the light diffusion plate may be insufficient, whereby cracks may be generated during processing, reliability testing and the like.

The lower limit of the average particle diameter of the diffusion agent is preferably 1.0 μm, more preferably 1.5 μm, and still more preferably 2.0 μm. Meanwhile, the upper limit of the average particle diameter of the diffusion agent is preferably 7.0 μm, more preferably 6.0 μm, and still more preferably 5.0 μm. When the average particle diameter of the diffusion agent is less than the lower limit, sufficient diffusibility may not be provided. To the contrary, when the average particle diameter of the diffusion agent is greater than the upper limit, the transmitted light in the resin matrix may not be uniformly diffused.

Production Method of Light Diffusion Plate

Although the production method of the light diffusion plate of the embodiment of the present invention is not particularly limited, and for example, a production method which includes: compounding by kneading a resinous material and a diffusion agent in an extrusion molding apparatus to produce pellets; and extruding pellets obtained after the compounding, by using an extrusion molding apparatus may be adopted.

Advantages

The light diffusion plate of the embodiment of the present invention includes the resin matrix formed from a polycarbonate resin, and Mw of the polycarbonate resin is no less than an appropriate lower limit; therefore, the light diffusion plate has superior mechanical strength. In addition, the light diffusion plate has Mw of the polycarbonate resin of no greater than an appropriate upper limit, and has Mw/Mn of no less than an appropriate lower limit; therefore, a high temperature is not needed in production. Thus, the light diffusion plate enables selection of a forming temperature that is less likely to result in generation of defects in the production. Moreover, since the light diffusion plate has Mw/Mn of the polycarbonate resin of no greater than an appropriate upper limit, a component having a low molecular weight and a component having a high molecular weight are included in small amounts. Thus, the light diffusion plate enables generation defects to be inhibited which results from a component having a low molecular weight and a component having a high molecular weight in the production. In other words, the light diffusion plate has superior mechanical strength even if being formed to be thin, with inhibited generation of defects in the production.

FIG. 1 shows a schematic cross-sectional view illustrating a light diffusion plate for a direct-lit backlight unit. The light diffusion plate comprises a resin matrix 2 and a diffusion agent 3 dispersed in the resin matrix 2.

Figure 2:
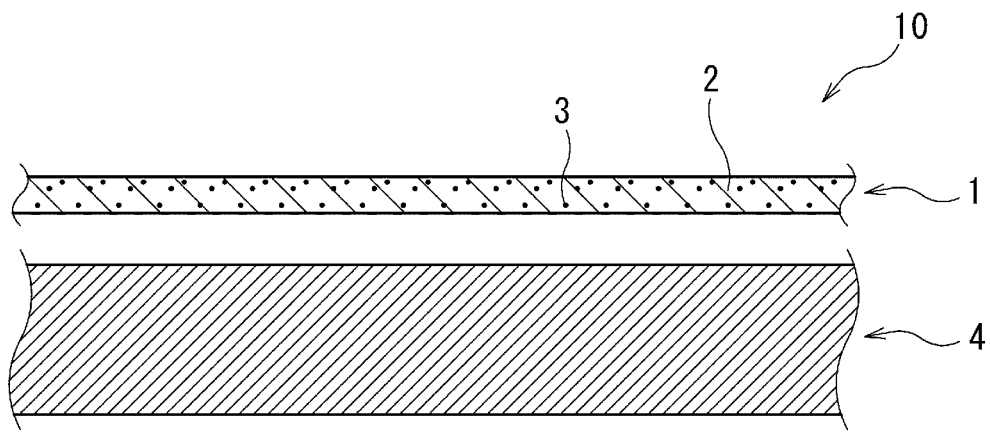
FIG. 2 is a schematic cross sectional view illustrating a direct-lit backlight unit comprising the light diffusion plate of FIG. 1.

FIG. 2 shows a schematic cross sectional view illustrating a direct-lit backlight unit 10 comprising the light diffusion plate 1 of FIG. 1 and a direct-lit backlight 4.

Other Embodiments

The embodiments disclosed herein should be construed as being not restrictive but illustrative in all terms. The scope of the present invention is not limited to the constitutions of the aforementioned embodiments, and including claimed features, equivalents to claims, and all modifications within the scope of claims is intended.

Although only the light diffusion plate is described in the embodiments described above, a direct-lit backlight unit may have a structure provided with the aforementioned light diffusion plate. The aforementioned light diffusion plate has superior mechanical strength even if being formed to be thin, with inhibited generation of defects in production; therefore, due to having been provided with the light diffusion plate, the direct-lit backlight unit enables reduction in size.

Examples

Hereinafter, the present invention will be described more specifically by way of Examples, but the present invention is not limited to the following Examples.

Light Diffusion Plates of No. 1 to No. 12

Light diffusion plates of No. 1 to No. 12 were produced by extrusion molding. The light diffusion plate had an average thickness of 1.0 mm. The content of the polycarbonate resin with respect to the resin matrix was 100% by mass, and the content of the diffusion agent with respect to 100 parts by mass of the resin matrix was 1 part by mass. In addition, silicone beads having an average particle diameter of 3.0 m were used as the diffusion agent. The forming temperature of the light diffusion plate was selected such that fluidity of the resinous material became adequate for the extrusion molding. Mw of the polycarbonate resin, Mw/Mn of the polycarbonate resin, and the forming temperature of the light diffusion plate are shown in Table 1.

Evaluations of Light Diffusion Plate

The yellowness index and the percentage content of defects were measured on the light diffusion plates of No. 1 to No. 12 thus produced, and the light diffusion plates were further subjected to a flexibility test in order to study the mechanical strength. These results are shown in Table 1.

The yellowness index was obtained by measuring tristimulus values (X, Y, Z) through using a colorimetric color-difference meter, and calculating from these values in accordance with JIS-K7373 (2006).

The percentage content of defects was determined by observation of discolored regions having a length of no less than 200 m through using a microscope, and defined based on the number of the discolored regions per m$^2$.

As the flexibility test, a procedure was employed including: wrapping the light diffusion plate around by 180 degree a cylinder having an external diameter of 20 mm; and confirming as to whether or not crack of the light diffusion plate was generated. It is to be noted that in Table 1, "A" indicates that no crack of the light diffusion plate was generated, and "B" indicates that the crack of the light diffusion plate was generated.

TABLE 1

| No. | Mw | Mw/Mn | Forming temperature (° C.) | Yellowness index | Percentage content of defects (defect(s)/m$^2$) | Flexibility test |
|---|---|---|---|---|---|---|
| 1 | 31600 | 2.0 | 260 | 11.39 | 3 | A |
| 2 | 30800 | 3.0 | 260 | 11.55 | 1 | A |
| 3 | 63700 | 1.9 | 280 | 11.98 | 3 | A |
| 4 | 60900 | 2.9 | 280 | 11.95 | 6 | A |
| 5 | 28400 | 1.9 | 260 | 11.50 | 7 | B |
| 6 | 27100 | 3.0 | 260 | 11.32 | 7 | B |
| 7 | 69100 | 1.9 | 300 | 15.22 | 131 | A |
| 8 | 68900 | 2.9 | 300 | 15.21 | 186 | A |
| 9 | 32200 | 1.5 | 290 | 13.11 | 18 | A |
| 10 | 64200 | 1.4 | 300 | 15.44 | 12 | A |
| 11 | 31000 | 3.4 | 270 | 12.43 | 43 | A |
| 12 | 62100 | 3.5 | 290 | 13.21 | 68 | A |

The light diffusion plates of No. 1 to No. 4 had Mw of the polycarbonate resin of no less than $3.0 \times 10^4$ and no greater than $6.5 \times 10^4$, and Mw/Mn of the polycarbonate resin of no less than 1.8 and no greater than 3.2. The light diffusion plates of No. 1 to No. 4 had the yellowness index of no greater than 12, with the percentage content of defects being no greater than 6, and generation of no crack was confirmed in the flexibility test. Accordingly, the light diffusion plates of No. 1 to No. 4 are concluded to be superior in the mechanical strength, with generation of defects in the production being inhibited.

The light diffusion plates of No. 5 to No. 6 had Mw of the polycarbonate resin of less than $3.0 \times 10^4$. Generation of the crack of the light diffusion plates of No. 5 to No. 6 was confirmed in the flexibility test. Accordingly, the light diffusion plates of No. 5 to No. 6 are concluded to be inferior in the mechanical strength due to small Mw of the polycarbonate resin.

The light diffusion plates of No. 7 to No. 8 had Mw of the polycarbonate resin of greater than $6.5 \times 10^4$. The light diffusion plates of No. 7 to No. 8 had the yellowness index of greater than 12, with the percentage content of defects of no less than 131 being verified. Accordingly, due to great Mw of the polycarbonate resin, the light diffusion plates of No. 7 to No. 8 are concluded to fail to inhibit generation of defects in the production, with deterioration of the resin being in progress during the molding.

The light diffusion plates of No. 9 to No. 10 had Mw/Mn of the polycarbonate resin of less than 1.8. Furthermore, the light diffusion plates of No. 11 to No. 12 had Mw/Mn of the polycarbonate resin of greater than 3.2. The light diffusion plates of No. 9 to No. 12 had the yellowness index of greater than 12, with the percentage content of defects of no less than 12 being verified. Accordingly, due to Mw/Mn of the polycarbonate resin not falling within the appropriate range, the light diffusion plates of No. 9 to No. 12 are concluded to fail to inhibit generation of defects in the production, with deterioration of the resin being in progress during the molding.

INDUSTRIAL APPLICABILITY

The light diffusion plate of the embodiment of the present invention has superior mechanical strength even if being formed to be thin, with inhibited generation of defects in production. Therefore, the direct-lit backlight unit that includes the light diffusion plate of the embodiment of the present invention enables reduction in size.

What is claimed is:

1. A light diffusion plate for a direct-lit backlight unit comprising:
    a resin matrix; and
    a diffusion agent dispersed in the resin matrix,
    wherein,
    a principal component of the resin matrix is a polycarbonate resin,
    a ratio (Mw/Mn) of a weight average molecular weight (Mw) of the polycarbonate resin to a number average molecular weight (Mn) of the polycarbonate resin is no less than 1.8 and no greater than 3.2, wherein Mw and Mn are determined by gel permeation chromatography using polystyrene as a standard,
    the weight average molecular weight (Mw) of the polycarbonate resin is no less than $3.0 \times 10^4$ and no greater than $6.5 \times 10^4$,
    a content of the diffusion agent with respect to 100 parts by mass of the resin matrix is no less than 0.2 parts by mass and no greater than 10 parts by mass, and
    an average particle diameter of the diffusion agent is no less than 1.0 μm and no greater than 7.0 μm.

2. The light diffusion plate according to claim 1, having an average thickness of no less than 0.1 mm and no greater than 1.0 mm.

3. The light diffusion plate according to claim 1, having a yellowness index of no greater than 12.

4. A direct-lit backlight unit comprising the light diffusion plate according to claim 1.

\* \* \* \* \*